United States Patent
Khasnabish

(10) Patent No.: US 9,397,887 B2
(45) Date of Patent: Jul. 19, 2016

(54) SYSTEM AND METHOD FOR CLOUD-BASED SESSION BORDER GATEWAY IMPLEMENTATION

(75) Inventor: Bhumip Khasnabish, Lexington, MA (US)

(73) Assignee: ZTE (USA) Inc., Austin, TX (US)

( * ) Notice: Subject to any disclaimer, the term of this patent is extended or adjusted under 35 U.S.C. 154(b) by 154 days.

(21) Appl. No.: 13/982,971

(22) PCT Filed: Jan. 26, 2012

(86) PCT No.: PCT/US2012/022690
§ 371 (c)(1),
(2), (4) Date: Sep. 26, 2013

(87) PCT Pub. No.: WO2012/106177
PCT Pub. Date: Aug. 9, 2012

(65) Prior Publication Data
US 2014/0019622 A1   Jan. 16, 2014

(51) Int. Cl.
*H04L 12/24* (2006.01)
*H04L 12/703* (2013.01)
*H04L 12/707* (2013.01)
*H04L 29/08* (2006.01)

(52) U.S. Cl.
CPC ........ *H04L 41/0806* (2013.01); *H04L 41/0668* (2013.01); *H04L 45/22* (2013.01); *H04L 45/28* (2013.01); *H04L 67/10* (2013.01)

(58) Field of Classification Search
CPC ... H04L 65/1016; H04L 67/141; H04L 67/10; H04L 69/321; H04L 67/02; H04L 12/1863; H04L 45/22; H04L 45/28; H04L 41/0668
See application file for complete search history.

(56) References Cited

U.S. PATENT DOCUMENTS

| 7,570,587 | B1 | 8/2009 | Wilson et al. |
| 7,656,797 | B2 | 2/2010 | Khasnabish et al. |
| 7,796,608 | B2* | 9/2010 | Rawlins et al. ..... H04L 12/5695 370/351 |
| 7,938,727 | B1* | 5/2011 | Konkle ........................ 463/42 |
| 8,456,984 | B2* | 6/2013 | Ranganathan et al. . H04L 49/70 370/216 |

(Continued)

FOREIGN PATENT DOCUMENTS

EP     2109264 A1     10/2009

OTHER PUBLICATIONS

Multiservice Forum: "MSF Session Border Gateway Requirements", Oct. 6, 2006, pp. 1-28, XP055146005, available at <http://www.msforum.org/techinfo/approved/MSF-PS-SBG-001.00-Final.pdf>.

(Continued)

*Primary Examiner* — Patrice Winder
*Assistant Examiner* — Aye M Aung
(74) *Attorney, Agent, or Firm* — Drinker Biddle & Reath LLP

(57) ABSTRACT

A system and method for implementing distributed virtual-resource-based (cloud-based) session border gateway (SBG) functions are presented. Because no dedicated physical resources need to be committed for implementation of the SBG features and functions, as in traditional border gateway functions implementations, the invention has significant cost, resource allocation, integration, and operational advantages over traditional methods. In addition, new features and functions can be easily developed and integrated with the Cloud-Based SBG (CB-SBG) implementations very cost-effectively.

20 Claims, 2 Drawing Sheets

(56) References Cited

U.S. PATENT DOCUMENTS

| | | | |
|---|---|---|---|
| 8,650,298 B2* | 2/2014 | Daly et al. | G06F 9/505 709/226 |
| 2007/0002764 A1* | 1/2007 | Papadimitriou | 370/252 |
| 2007/0019619 A1* | 1/2007 | Foster et al. | 370/352 |
| 2007/0036151 A1* | 2/2007 | Baeder | 370/352 |
| 2007/0086433 A1 | 4/2007 | Cunetto et al. | |
| 2007/0211716 A1* | 9/2007 | Oz et al. | H04L 12/4641 370/389 |
| 2008/0316938 A1 | 12/2008 | Shi | |
| 2010/0257263 A1 | 10/2010 | Casado et al. | |
| 2011/0113141 A1* | 5/2011 | Veenstra et al. | 709/226 |
| 2011/0289119 A1* | 11/2011 | Hu et al. | 707/803 |
| 2012/0009903 A1* | 1/2012 | Schultz et al. | 455/412.2 |

OTHER PUBLICATIONS

Takeshi Osaka et al., B-6-62 "A study of improvement of a function on the session border controller" Proceedings of the 2009 IEICE Communications Society Conference, Sep. 15, 2009, pp. 2-7.

Shimonishi, Hideyuki et al., "Virtualized network infrastructure using OpenFlow", Network Operations and Management Symposium WOrkshipos (Noms Wksps), 2010 IEEE/IFIP, IEEE, Piscataway, NJ, USA, Apr. 19, 2010, pp. 74-79.

B. Khasnabish, et al., Cloud Reference Frameworkdraft-khasnabish-cloud-reference-framework-00.txt, Dec. 31, 2010, pp. 1-27, URL, <https://tools.ietf.org/pdf/draft-khasnabish-cloud-reference-framework-00.pdf>.

Supplementary European Search Report for EP Application No. 12 74 1704 dated Oct. 13, 2014.

* cited by examiner

SYSTEM AND METHOD FOR CLOUD-BASED SESSION BORDER GATEWAY IMPLEMENTATION

FIELD OF THE INVENTION

This invention pertains to a system and method for session border gateway functions using distributed virtualized computing and communications resources.

BACKGROUND

A session border gateway (SBG) can be logically split into two entities, namely a signaling path function and a data path function. This split provides clarity when trying to narrow the functions addressed by different SBG types. These two functions may co-reside within the same physical element or may be separated with a protocol acting as the interface between them.

Traditionally, SBG features and functions are implemented in different ways:
 a) Stand-alone devices called session border controllers (SBCs);
 b) Integrated in the network infrastructure elements such as routers, gateways, switches, optical line termination (OLT) equipment, and Internet protocol based Digital Subscriber Line Access Multiplexer (IP-DSLAM); or
 c) A device at the border of wireless access and wireline core transport network.

A list of SBG features and functions can be found in, for example, MSF Session Border Gateway Requirements specification that is available at http://www.msforum.org/techinfo/approved/MSF-PS-SBG-001.00-FINAL.pdf. Moreover, an example of an infrastructure element-based implementation of SBG features and functions can be found in U.S. Pat. No. 7,656,797 entitled, "Method, Computer Program Product, And Apparatus For Providing A Distributed Router Architecture."

Certain drawbacks of utilizing infrastructure element-based implementation of SBG features and functions include:
 a) Costs;
 b) Time required for testing and integration with network;
 c) Static allocation of resources;
 d) Less flexibility in repositioning the resources; and
 e) Tighter coupling of computing and communications resources with pre-designed border features and functions.

Service providers in a dynamic and continuously-evolving networking and service development environment need:
 a) Protection of investment, i.e., investment in the resources that can be rapidly repurposed for different revenue generating applications and services; and/or
 b) Agility and flexibility, i.e., deploying emerging features and functions utilizing the computing and communications resources that already exist in the network.

SUMMARY OF THE INVENTION

The present invention addresses these issues and, for example, enables service providers to allocate their budget for computing, communications, and control infrastructure development rather than creating and installing silos of computing and networking gears which very often either remain underutilized or become obsolete before reaching the full potential (or providing the full return on investment).

In one aspect, there is provided a method that includes obtaining resource blocks for a signaling part of a session border gateway from a variety of networked resources, wherein the resource blocks are integrated into a pool and a unified view is presented to applications and services communicating with the signaling part of the session border gateway; controlling allocation of resources from a media part of the session border gateway via instructions over virtual private network links; obtaining resource blocks for the media part of the session border gateway from a variety of networked resources, wherein the resource blocks are integrated into a pool and a unified view is presented to the signaling part of the session border gateway; and using the resource blocks for the applications and services for a duration of time. The duration of time can range from a few seconds to tens or hundreds of hours.

Optionally, the virtual private network links run an open protocol with a standardized profile.

Optionally, the resource blocks are obtained from public, private, or community networks through open application and resource programming interfaces.

In another aspect, there is provided an apparatus that includes a signaling part of a session border gateway comprising resource blocks from a variety of networked resources, wherein the resource blocks are integrated into a pool and a unified view is presented to applications and services that communicate with the signaling part of the session border gateway; a media part of the session border gateway comprising resource blocks from a variety of networked resources, wherein the resource blocks are integrated into a pool and a unified view is presented to the signaling part of the session border gateway; wherein the signaling part of the session border gateway is further configured to control allocation of resources from the media part of the session border gateway via instructions over virtual private network links; and wherein the resource blocks for the applications and services are configured to be used for a duration of time. The duration of time can range from a few seconds to hundreds of hours, for example.

Optionally, the virtual private network links run an open protocol with a standardized profile.

Optionally, the resource blocks are from public, private, or community networks through open application and resource programming interfaces.

In yet another aspect, there is provided a system that includes means for obtaining resource blocks for a signaling part of a session border gateway from a variety of networked resources, wherein the resource blocks are integrated into a pool and a unified view is presented to applications and services communicating with the signaling part of the session border gateway; means for controlling allocation of resources from a media part of the session border gateway; means for obtaining resource blocks for the media part of the session border gateway from a variety of networked resources, wherein the resource blocks are integrated into a pool and a unified view is presented to the signaling part of the session border gateway; and means for using the resource blocks for the applications and services for a duration of time. The duration of time can range from a few seconds to hundreds of hours, for example.

Optionally, the virtual private network links run an open protocol with a standardized profile.

Optionally, the resource blocks are obtained from public, private, or community networks through open application and resource programming interfaces.

In a further aspect, there is provided an article of manufacture that includes instructions for obtaining resource blocks for a signaling part of a session border gateway from a variety of networked resources, wherein the resource blocks are integrated into a pool and a unified view is presented to applications and services communicating with the signaling part of the session border gateway; instructions for controlling allocation of resources from a media part of the session border gateway via instructions over virtual private network links; instructions for obtaining resource blocks for the media part of the session border gateway from a variety of networked resources, wherein the resource blocks are integrated into a pool and a unified view is presented to the signaling part of the session border gateway; and instructions for using the resource blocks for the applications and services for a duration of time. The duration of time can range from a few seconds to hundreds of hours.

Optionally, the virtual private network links run an open protocol with a standardized profile.

Optionally, the resource blocks are obtained from public, private, or community networks through open application and resource programming interfaces.

BRIEF DESCRIPTION OF THE DRAWINGS

A more complete understanding of the present invention may be realized by reference to the accompanying drawings, which are not necessarily drawn to scale. In the drawings, well-known elements in the relevant art have been omitted so as not to obscure the present invention in unnecessary detail.

DETAILED DESCRIPTION OF THE PREFERRED EMBODIMENTS OF THE PRESENT INVENTION

Figure 1:
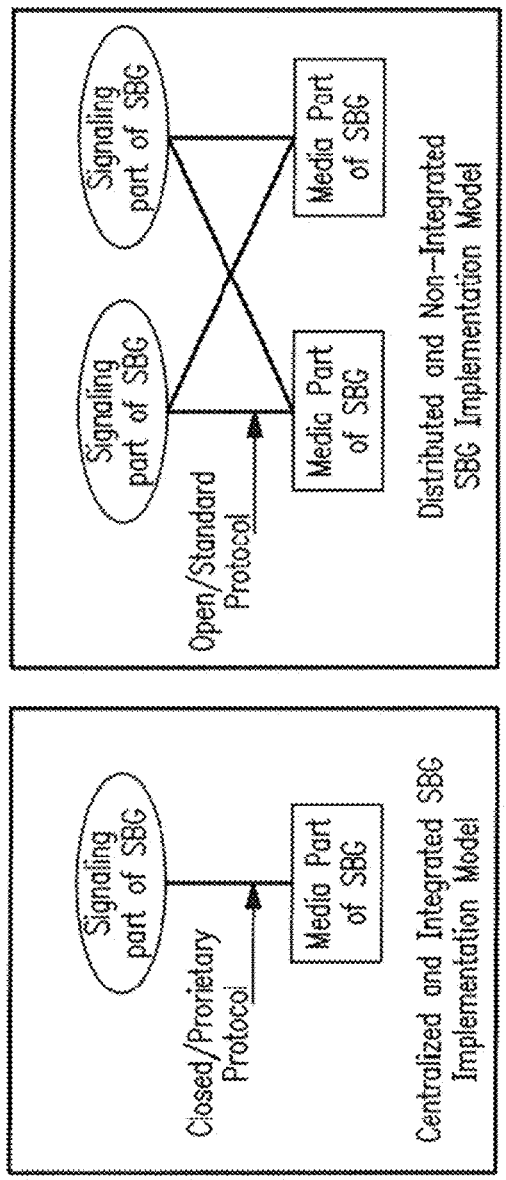
FIG. 1 illustrates block diagrams of traditional models for SBG implementations.

In traditional stand-alone or infrastructure element-based implementations of SBG functions, dedicated computing, memory, and communications resources are required. These resources need to be integrated with the network infrastructure and operated in a harmonious way both in terms of traffic management and privacy/authentication/security administration.

As a result, the time required for making the network ready for supporting the SBG features/functions and the costs for successfully achieving the desired results become prohibitively high. For example, additional router cards, ports, firewall, and control/processing resources need to be allocated and integrated for supporting the desired SBG features/functions. The level of integration efforts depend on the architecture.

According to embodiments of the present invention, Cloud-Based SBG (CB-SBG) implementation overcomes the aforementioned drawbacks of traditional SBG implementation because there is no need to pre-allocate computing, memory, and communications resources—either stand-alone or in the infrastructure network elements—for the purpose of supporting the SBG features/functions. Instead, the resources are obtained from public, private, or community networks through open application and resource programming interfaces (APIs and RPIs).

These AIPs/RPIs can use any one or more of the following: SOAP, XML, WSDL, Parlay/Parlay-X, HTTP, CORBA, and the like. The details of the API/RPI design and profiling are beyond the scope of this patent application. It is notable that these APIs/RPIs not only simplify access to the desired resources, but also guarantee rapid integration and interoperability with the existing network/infrastructure, security, availability, service continuity, and the like. This is due to the fact that the desired SBG features/functions are obtained by selectively searching the available networked resources through open APIs/RPIs and fetching them so that they can be utilized per the requirements of the applications and services for the duration of the service. For example, real-time availability of firewalling and DSP resources is mandatory for real-time Enterprise voice communications services over the public Internet.

In sum, any application or service that needs to utilize SBG features/functions can obtain those resources through open API/RPI from the network (e.g., the Internet) and then can use those resources for the duration of the session with guaranteed security and reliability. In other aspects, the invention provides a system and a computer program having features and advantages corresponding to those discussed above.

Exemplary embodiments are described hereinafter with reference to the accompanying drawings, in which exemplary embodiments and examples are shown. The embodiments of the invention may be in many different forms and should not be construed as limited to the embodiments set forth herein; rather, these embodiments are provided by way of example so that this disclosure will satisfy applicable legal requirements.

FIG. 1 schematically shows block diagrams of traditional models for SBG implementations. The Signaling part of SBG receives a request for resources from the applications and services for allocating the resources in the Media part of SBG, and allocates the resources blocks accordingly. In some implementations, policy, quality of service, and security requirements dictate these allocations. The interface between the Signaling part of SBG and the Media part of SBG can be open (standard protocol) or proprietary protocol, and the interface can be point to point or point to multi-point in order to support reliability through distribution of the resource requests.

The details of Cloud framework reference model can be found at https://tools.ietf.org/html/draft-khasnabish-cloud-reference-framework-00, which is incorporated by reference in its entirety.

Basically, the Cloud framework can be divided into four horizontal layers:
a) Application/Service Layer (ASL);
b) Resource Control Layer (RCL);
c) Resource Abstract and Virtualization Layer (RAVL);
d) Physical Resource Layer (PRL).

And one stacked vertical layer to support configuration management, registry, logging and auditing, security management, and service level agreement (SLA) management.

Figure 2:
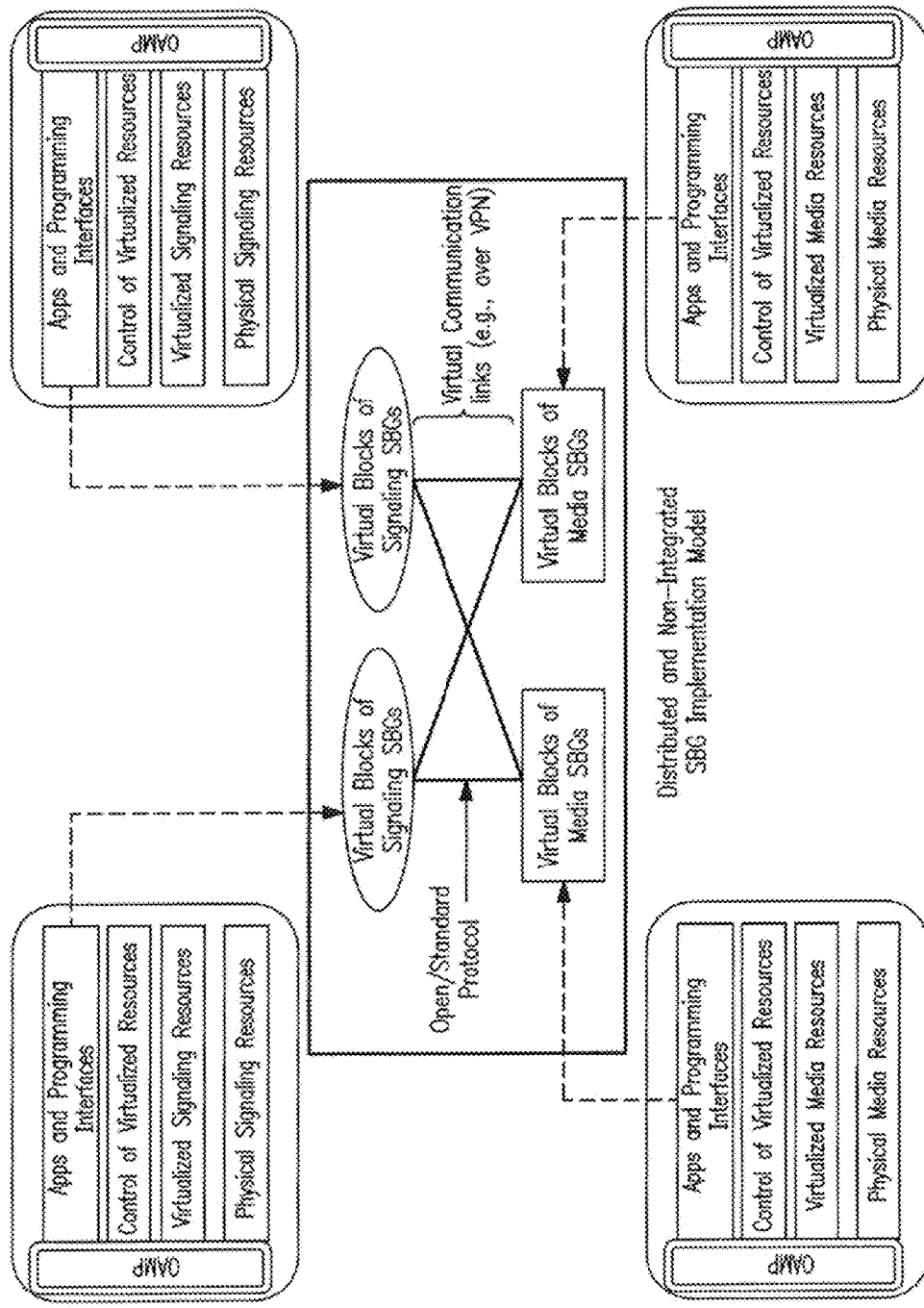
FIG. 2 illustrates a Cloud-Based SBG implementation model.

FIG. 2 shows a CB-SBG implementation model according to an embodiment of the present invention. In this implementation, the resources that constitute the Signaling part of SBG (the "Virtual Blocks of Signaling SBGs") are obtained from a set of networked resources, and utilized for the duration of the requirements. This duration can vary from a few seconds to tens or hundreds of hours.

The resource blocks for Signaling part of SBG can be obtained from a variety of networked resources and these blocks must be integrated into a pool of Signaling part of SBG resources so that a unified view can be presented to the applications and services that are communicating with the Signaling part of SBG block. The Signaling part of SBG controls the allocation of resources from the Media part of SBG with instructions over virtual private network links that run open protocol with standardized profile.

The resources that constitute the Media part of SBG (the "Virtual Blocks of Media SBGs") are obtained from a set of networked resources, and utilized for the duration of the requirements. This duration can vary from a few seconds to tens or hundreds of hours. The resource blocks for Media part of SBG can be obtained from a variety of networked sources and these blocks must be integrated into a pool of Media part of SBG resources so that a unified view can be presented to the Signaling part of SBG.

It should be understood that the methods and systems of the present invention are executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EEPROM's); and the like. Implementations of certain embodiments may further take the form of machine-implemented, including web-implemented, computer software.

The foregoing descriptions illustrate and describe certain embodiments of the present invention that are intended to explain best modes known of practicing the invention and to enable others skilled in the art to utilize the invention in such, or other, embodiments. It is to be understood that the invention is capable of use in various other combinations, modifications, and environments; and is capable of changes or modifications within the scope of the inventive concept as expressed herein, commensurate with the above teachings and/or skill or knowledge in the relevant art. Moreover, later-invented or -developed equipment that carries out the methods and/or combination elements set forth in the claims are within the scope of the invention. Therefore, it is to be understood that the inventions are not to be limited to the specific examples of the embodiments disclosed and that modifications and other embodiments are intended to be included within the scope of the appended claims.

What is claimed:

1. A method comprising:
    obtaining resource blocks for a signaling part of a distributed virtual session border gateway that is hosted on a plurality of distributed tangible networked elements including a plurality of distributed computing processors communicatively coupled to a plurality of distributed storage devices, from a variety of networked resources, wherein the resource blocks are integrated into a pool and a unified view of the pool is presented to applications and services communicating with the distributed virtual signaling part of the session border gateway;
    controlling, by the signaling part of the distributed virtual session border gateway, allocation of resources from a media part of the distributed virtual session border gateway via instructions over virtual network links;
    obtaining resource blocks for the media part of the distributed virtual session border gateway from a variety of networked resources, wherein the resource blocks are integrated into a pool and a unified view of the pool is presented to the signaling part of the distributed virtual session border gateway; and
    allocating the resource blocks for the applications and services for a duration of time.

2. The method of claim 1, wherein the duration of time is from a few seconds to hundreds of hours.

3. The method of claim 1, wherein the distributed virtual session border gateway is distributed and non-integrated.

4. The method of claim 1, wherein the virtual network links include at least one of virtual private network links and virtual network links that run an open protocol with a standardized profile.

5. The method of claim 1, wherein the resource blocks are obtained from public, private, or community networks through open application and resource programming interfaces.

6. An apparatus comprising:
    a distributed virtualized session border gateway that is realized in a plurality of distributed tangible networked elements including a plurality of distributed computing processors communicatively coupled to a plurality of distributed data storage devices, wherein the session border gateway obtains for a signaling part of the distributed virtualized session border gateway resource blocks from a variety of networked resources, wherein the resource blocks are integrated into a pool and a unified view of the pool is presented to applications and services that communicate with the signaling part of the distributed virtualized session border gateway; and
    wherein a media part of the distributed virtualized session border gateway comprising includes resource blocks from a variety of networked resources, wherein the resource blocks are integrated into a pool and a unified view of the pool is presented to the distributed virtualized signaling part of the session border gateway;
    wherein the signaling part of the distributed virtualized session border gateway is further configured to control allocation of resources from the media part of the distributed virtualized session border gateway via instructions over a plurality of virtual network links; and
    wherein the resource blocks for the applications and services are allocated to be used for a duration of time.

7. The apparatus of claim 6, wherein the duration of time is from a few seconds to tens or hundreds of hours.

8. The apparatus of claim 6, wherein the distributed virtualized session border gateway is distributed and non-integrated.

9. The apparatus of claim 6, wherein the virtual network links include at least one of virtual private network links and virtual network links that run an open protocol with a standardized profile.

10. The apparatus of claim 6, wherein the resource blocks are from public, private, or community networks through open application and resource programming interfaces.

11. A system comprising:
    means realized on a plurality of distributed tangible networked computing processors communicatively coupled to a plurality of distributed tangible networked data storage devices wherein the means obtains for obtaining resource blocks for a signaling part of a distributed virtualized session border gateway resource blocks from a variety of networked resources, wherein the resource blocks are integrated into a pool and a unified view of the pool is presented to applications and services communicating with the signaling part of the distributed virtualized session border gateway;
    means realized on the processors and storage devices, for controlling allocation of resources from a media part of the distributed virtualized session border gateway;
    means realized on the processors and storage devices, for obtaining resource blocks for the media part of the distributed virtualized session border gateway from a variety of networked resources, wherein the resource blocks are integrated into a pool and a unified view of the pool is presented to the signaling part of the distributed virtualized session border gateway; and wherein the signaling part of the distributed virtualized session border gateway operates over a plurality of virtual network links; and means for using wherein the resource blocks for the applications and services are allocated for a duration of time.

12. The system of claim 11, wherein the duration of time is from a few seconds to tens or hundreds of hours.

13. The system of claim 11, wherein the distributed virtualized session border gateway is distributed and non-integrated.

14. The system of claim 11, wherein the virtual network links include at least one of virtual private network links and virtual network links that run an open protocol with a standardized profile.

15. The system of claim 11, wherein the resource blocks are obtained from public, private, or community networks through open application and resource programming interfaces.

16. An article of manufacture including a non-transitory computer-readable medium having instructions stored thereon which, when executed on a plurality of networked computing processors communicatively coupled to a plurality of networked data storage devices as a distributed virtual session border gateway, the instructions comprising: instructions for obtaining resource blocks for a signaling part of the distributed virtual session border gateway from a variety of networked resources, wherein the resource blocks are integrated into a pool and a unified view of the pool is presented to applications and services communicating with the signaling part of the distributed virtual session border gateway;

instructions for controlling, by the signaling part of the distributed virtual session border gateway, allocation of resources from a media part of the distributed virtual session border gateway via instructions over a plurality of virtual private network links;

instructions for obtaining resource blocks for the media part of the distributed virtual session border gateway from a variety of networked resources, wherein the resource blocks are integrated into a pool and a unified view is presented to the signaling part of the distributed virtual session border gateway; and instructions for allocating the resource blocks for the applications and services for a duration of time.

17. The article of manufacture of claim 16, wherein the duration of time is from a few seconds to tens or hundreds of hours.

18. The article of manufacture of claim 16, wherein the distributed virtual session border gateway is distributed and non-integrated.

19. The article of manufacture of claim 16, wherein the virtual network links include at least one of virtual private network links and network links that run an open protocol with a standardized profile.

20. The article of manufacture of claim 16, wherein the resource blocks are obtained from public, private, or community networks through open application and resource programming interfaces.

* * * * *